(12) United States Patent
Hwang

(10) Patent No.: US 9,308,886 B1
(45) Date of Patent: Apr. 12, 2016

(54) ACTIVE HOOD DEVICE FOR VEHICLE

(71) Applicant: Hyundai Motor Company, Seoul (KR)

(72) Inventor: In Hwang, Hwaseong-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/565,322

(22) Filed: Dec. 9, 2014

(30) Foreign Application Priority Data

Sep. 26, 2014 (KR) .......................... 10-2014-129416

(51) Int. Cl.
*B60R 21/38* (2011.01)
*B60R 21/00* (2006.01)

(52) U.S. Cl.
CPC ......... *B60R 21/38* (2013.01); *B60R 2021/0004* (2013.01)

(58) Field of Classification Search
CPC ...................... B60R 21/38; B60R 2021/0004
See application file for complete search history.

(56) References Cited

U.S. PATENT DOCUMENTS

| | | | |
|---|---|---|---|
| 6,257,657 B1 * | 7/2001 | Sasaki ...................... | 296/187.09 |
| 7,232,178 B2 * | 6/2007 | Neal et al. ................ | 296/187.04 |
| 8,534,410 B2 * | 9/2013 | Nakaura et al. .......... | 180/274 |
| 9,010,478 B2 * | 4/2015 | Fritzon ..................... | 180/274 |
| 2006/0175844 A1 * | 8/2006 | Neal et al. ................ | 292/340 |
| 2007/0102219 A1 * | 5/2007 | Park ......................... | 180/274 |
| 2008/0156556 A1 * | 7/2008 | Takahashi ................. | 180/69.21 |
| 2010/0244484 A1 * | 9/2010 | Nakaura et al. .......... | 296/187.04 |

FOREIGN PATENT DOCUMENTS

| | | |
|---|---|---|
| JP | 11-310157 A | 11/1999 |
| JP | 4555281 B2 | 7/2010 |
| JP | 4986724 B2 | 5/2012 |
| KR | 10-0489003 B1 | 5/2005 |
| KR | 10-0770135 B1 | 10/2007 |

\* cited by examiner

*Primary Examiner* — Drew Brown

(74) *Attorney, Agent, or Firm* — Morgan, Lewis & Bockius LLP

(57) ABSTRACT

An active hood device for a vehicle may include a hood panel which is provided in the front of a vehicle body to cover an engine room, and rotatably mounted by a hood hinge coupled to a rear end of the hood panel, a hinge actuator which has a first side connected to the hood hinge, and a second side coupled to a bracket coupled to the vehicle body, and has a rod movable, and an operating unit which connects the bracket and the hood hinge, and allows the rod to be moved when the rod is raised, wherein at a time of a vehicle-pedestrian collision accident, the hood actuator is operated by a signal from a detecting sensor installed at a front portion of the vehicle, to raise the rod, and the rod allows the hood panel to pop up while being raised by the operating unit.

5 Claims, 3 Drawing Sheets

ACTIVE HOOD DEVICE FOR VEHICLE

CROSS-REFERENCE TO RELATED APPLICATIONS

The present application claims priority to Korean Patent Application No. 10-2014-129416, filed on Sep. 26, 2014, the entire contents of which is incorporated herein for all purposes by this reference.

BACKGROUND OF THE INVENTION

1. Field of the Invention

The present invention relates to an active hood device for a vehicle, and more particularly, to an active hood device for a vehicle, in which at the time of a vehicle-pedestrian collision accident, a hood actuator is operated by a signal from a detecting sensor installed at a front portion of the vehicle so as to raise a rod, the rod is raised upward and rearward by an operating unit and allows a hood panel to pop up upward and rearward, and a striker, which is installed at a front end of the hood panel, includes an upper catching portion and a lower catching portion.

2. Description of Related Art

In general, a hood panel is mounted at an upper side of an engine room disposed in the front of the vehicle, and serves to shut off engine noise from the engine room and protect the engine room.

In order to perform maintenance or general routine inspection of various types of components installed in the engine room, a striker, which has one side that is connected with a vehicle body by means of a hood hinge, and the other side that is formed to be caught by a hood latch, is mounted to the hood panel, thereby selectively opening the hood panel.

Typically, the hood latch is a locking and unlocking means for opening and closing the hood panel, and configured as a secondary locking structure that prevents the hood panel from being opened and safely maintains a closed state when the hood panel needs to be in closed state at normal times or when the vehicle travels.

The hood latch is positioned at a lower portion of a front tip of the hood panel and installed at the vehicle body side, and serves to lock or unlock the striker mounted to the hood panel using a hook or the like.

Meanwhile, due to recently enforced pedestrian protection regulations, instances in which a structure is adopted for reducing injuries to pedestrians at the front side of the vehicle based on a front bumper and a hood of the vehicle body have increased, and this structure serves as an important factor that dictates marketability of the vehicle.

The pedestrian protection law, which is enforced in Europe and the like, includes contents regarding a method of evaluating performance of the vehicle by allowing a leg form, an upper leg form, and a head form, which represent a pedestrian, to collide with the front portion of the vehicle in a stopped state.

In general, when a vehicle collides with a pedestrian, the pedestrian is catapulted away from the vehicle onto the road in a direction in which the vehicle travels, which may lead to a collateral accident, such that the pedestrian is hit again by the assault vehicle, thereby increasing a probability of death of the pedestrian.

The main purpose of the pedestrian protection regulations is to reduce a probability of death of the pedestrian which is caused by distinctive characteristics of the pedestrian accident.

In order to reduce impact applied to the pedestrian's body and absorb inertial energy of the body at the time of a collision between the hood panel of the vehicle and the pedestrian, a shock absorbing space is required between the hood panel and the engine.

However, the hood panels of most of vehicles are designed to be as low as possible in order to ensure frontal visibility for a driver, and due to this configuration, an interval between the engine and the hood panel just provides a minimum space for avoiding interference.

Therefore, there has been used an active hood device for a vehicle, which adopts a method of expanding a shape of the hood panel, or a method of allowing the hood panel to instantaneously pop up when a sensor senses impact, in order to ensure an additional shock absorbing space.

FIG. 1 is an exemplified view schematically illustrating an appearance of an active hood device for a vehicle in the related art.

As illustrated in FIG. 1, an active hood device for a vehicle in the related art has a structure in which when impact on a bumper is sensed by utilizing a detecting sensor installed at a front portion of the vehicle, a hinge actuator 3 coupled to a hood hinge 2 is operated to allow a hood hinge (that is, a rear portion of the hood panel 1) to pop up, and at the same time, a latch actuator 5 coupled to a hood latch 4 is operated to allow a hood latch (that is, a front portion of the hood panel 1) to pop up.

That is, since both the front portion and the rear portion of the hood panel 1 pop up, a shock absorbing space is ensured between the hood panel 1 and the engine (not illustrated), thereby reducing impact applied to the pedestrian's body.

However, according to the active hood device for a vehicle in the related art, the hinge actuator and the latch actuator need to be additionally installed to allow the hood panel to pop up, and as a result, there are problems in that costs for producing the vehicle are increased, and a weight of the vehicle is increased.

In addition, according to the active hood device for a vehicle in the related art, the structure of the active hood device is complicated, and as a result, there are drawbacks in that the number of working processes is large, time required to assemble the active hood device is increased, and it is disadvantageous in terms of a package layout of the vehicle because the active hood device occupies a large space.

In order to solve the disadvantages in terms of cost reduction, a structure in which the latch actuator is omitted, and a single hinge actuator allows the hood panel to pop up has been developed, but in the case of this structure, a rear end portion of the hood panel is raised, and the hood panel is rotated based on fixing points of a striker and the hood latch, and as a result, there is a problem in that a front end portion of the hood panel is lowered even more.

That is, when the hood panel pops up, the front end portion of the hood panel is lowered while being rotated, and becomes close to the engine, and as a result, there are problems in that a shock absorbing space becomes small, and pedestrian protection performance deteriorates.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active hood device for a vehicle, which may implement pedestrian protection performance that is equal to or more improved than pedestrian protection performance of an active hood device for a vehicle in the related art, and may reduce production costs for the vehicle and a weight of the vehicle.

The present invention may have also been made in an effort to provide an active hood device for a vehicle, which is configured to allow a hood panel to pop up upward and rearward by an operating unit with a comparatively simple structure so as to reduce the number of working processes and time required for assembly, and which may be applied to all types of vehicles by improving a package layout of the vehicle.

Technical problems to be achieved in the present invention are not limited to the aforementioned technical problems, and any other not-mentioned technical problems will be obviously understood from the description below by those skilled in the technical field to which the present invention pertains.

An aspect of the present invention provides an active hood device for a vehicle, including a hood panel which is provided in the front of a vehicle body so as to cover an engine room of the vehicle, and rotatably mounted by means of a hood hinge coupled to a rear end of the hood panel, a hinge actuator which may have one side connected to the hood hinge, and the other side coupled to a bracket coupled to the vehicle body, and may have a rod that is movable upward and downward, and an operating unit which connects the bracket and the hood hinge, and allows the rod of the hinge actuator to be moved upward and rearward when the rod is raised, in which at the time of a vehicle-pedestrian collision accident, the hood actuator is operated by a signal from a detecting sensor installed at a front portion of the vehicle, so as to raise the rod, and the rod allows the hood panel to pop up upward and rearward while being raised upward and rearward by the operating unit.

The active hood device for a vehicle according to the exemplary embodiment of the present invention may further include a striker which is installed to protrude downward at a front end of the hood panel, and a hood latch which is installed on the vehicle body so that the striker is caught by the hood latch, and the hood panel is in a locked state.

In the active hood device for a vehicle according to the exemplary embodiment of the present invention, the striker may include an upper catching portion which is disposed at a rear side of the vehicle, and caught by the hood latch at normal times, and a lower catching portion which is disposed at a front side of the vehicle, and caught by the hood latch when the hood panel pops up, in which the upper catching portion is formed at a relatively higher position than the lower catching portion.

In the active hood device for a vehicle according to the exemplary embodiment of the present invention, the operating unit may include a first link member which may have one end that is slidably accommodated in a circular arc shaped slot formed in the bracket, a second link member which rotatably connects one end of the first link member and one side of the hood hinge, and a third link member which rotatably connects the other end of the first link member and the other side of the hood hinge.

The active hood device for a vehicle according to the exemplary embodiment of the present invention may further include a supporting member which rotatably connects the first link member and the bracket, in which the supporting member supports the operating unit at a lower end of the first link member when the hood panel pops up.

The present invention having the aforementioned configuration allows the hood panel to pop up upward and rearward using the hinge actuator, which raises the hood hinge, and the operating unit at the time of a pedestrian collision accident, such that the latch actuator in the related art may be omitted, thereby reducing production costs for the vehicle and a weight of the vehicle.

The present invention configures the striker which may have two-stage catching portions including the upper catching portion and the lower catching portion, such that the front portion of the hood panel is prevented from being lowered even though the hood panel pops up by a single hinge actuator, thereby implementing pedestrian protection performance that is equal to or more improved than that in the related art.

The present invention is configured to allow the hood panel to pop up upward and rearward using the operating unit having a comparatively simple structure, such that the number of working processes and time required for assembly are reduced, the overall size is reduced by about 87%, and a package layout is improved, thereby applying the active hood device to all types of vehicles.

The present invention may maintain a pop-up state of the hood panel using the supporting member, thereby preventing the pedestrian's body from secondarily colliding with the engine after the pedestrian's body collides with the hood panel.

The information disclosed in this Background of the Invention section is only for enhancement of understanding of the general background of the invention and should not be taken as an acknowledgement or any form of suggestion that this information forms the prior art already known to a person skilled in the art.

Figure 1:
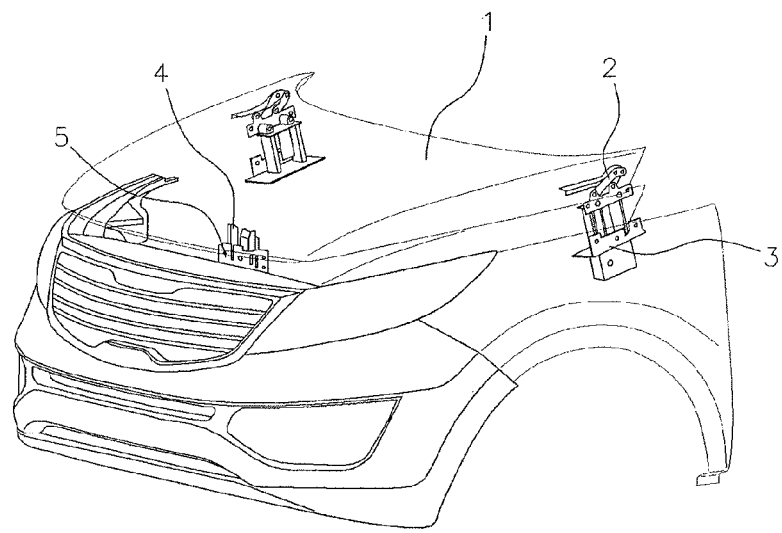
FIG. 1 is an exemplified view schematically illustrating an appearance of an active hood device for a vehicle in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings so that those skilled in the technical field to which the present invention pertains may easily carry out the present invention. However, the present invention may be implemented in various different forms, and is not limited to the exemplary embodiments described herein.

A part irrelevant to the description will be omitted to clearly describe the present invention, and the same or similar constituent elements will be designated by the same reference numerals throughout the specification.

In addition, terms or words used in the specification and the claims should not be interpreted as a general and dictionary meaning and should be interpreted as a meaning and a concept which conform to the technical spirit of the present invention based on a principle that an inventor can appropriately define a concept of a term in order to describe his/her own invention by the best method.

Figure 2:
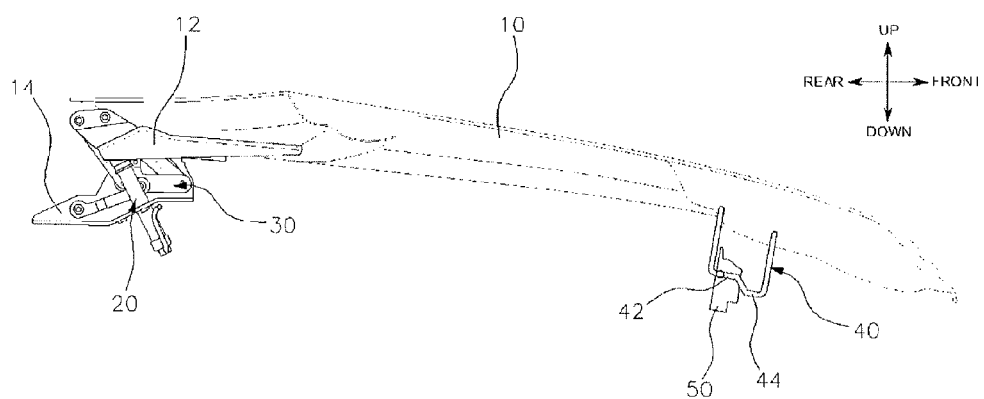
FIG. 2 is a side view illustrating an active hood device for a vehicle according to an exemplary embodiment of the present invention before a hood panel pops up.
Figure 3:
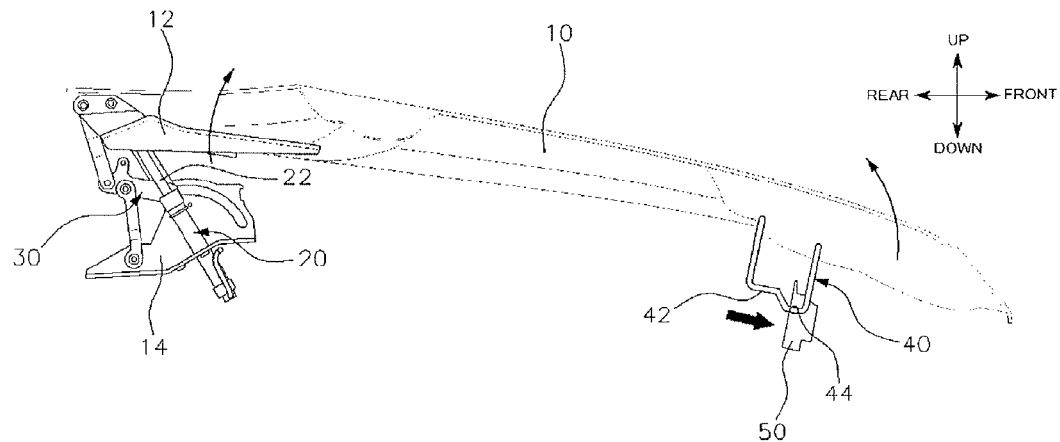
FIG. 3 is a side view illustrating the active hood device for a vehicle according to the exemplary embodiment of the present invention after the hood panel pops up.
Figure 4:
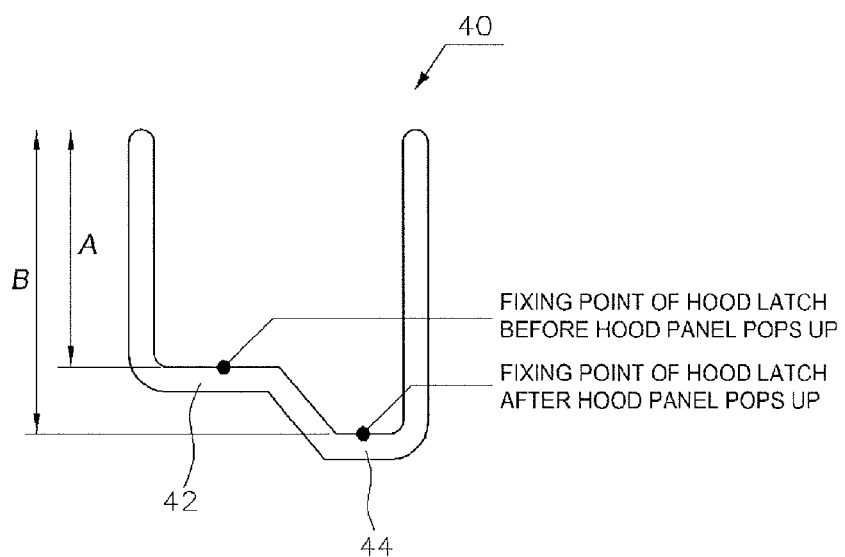
FIG. 4 is a schematic view illustrating changes of fixing points of a striker and a hood latch according to the exemplary embodiment of the present invention.

FIG. 2 is a side view illustrating an active hood device for a vehicle according to an exemplary embodiment of the present invention before a hood panel pops up, FIG. 3 is a side view illustrating the active hood device for a vehicle according to the exemplary embodiment of the present invention after the hood panel pops up, and FIG. 4 is a schematic view illustrating changes of fixing points of a striker and a hood latch according to the exemplary embodiment of the present invention.

As illustrated in FIGS. 2 and 3, a hood panel 10 is generally mounted to be rotatable upward and downward by a hood hinge 12 that is coupled to a rear end of the hood panel 10, and a driver may freely open and close the hood panel 10 and may perform maintenance of various types of components in an engine room.

A bracket 14 is coupled to a vehicle body below a portion where the hood hinge 12 is coupled, and the hood hinge 12 and the bracket 14 are connected to each other by a hinge actuator 20 that has one side rotatably coupled to the hood hinge 12, and the other side coupled to the bracket 14.

As illustrated in FIG. 2, a rod 22 of the hinge actuator is accommodated at normal times or when the vehicle travels, and as illustrated in FIG. 3, the rod 22 of the hinge actuator protrudes and raises the hood panel 10 at the time of a pedestrian collision accident.

Based on an operating method, the hinge actuator 20 is classified into an explosive type actuator which moves the rod 22 using driving force that is generated when an embedded explosive explodes, and a solenoid type actuator which moves the rod 22 using magnetic force of a solenoid electromagnet.

Both of the two types of actuators may be utilized as the hinge actuator 20 used in an exemplary embodiment of the present invention, and in comparison with the solenoid type actuator, the explosive type actuator has advantages in that a structure thereof is simple, a probability of a malfunction may be lowered, and production costs are relatively low.

In this case, the bracket 14 and the hood hinge 12 are connected to each other by an operating unit 30, and the operating unit 30 serves to guide the rod 22 of the hinge actuator to be moved upward and rearward when the rod 22 is raised.

At the time of a vehicle-pedestrian collision accident, the hinge actuator 20 raises the rod 22 using driving force by a signal from a detecting sensor installed at a front portion of the vehicle, and as the rod 22 is raised upward and rearward by the operating unit 30, the hood panel 10 is raised upward and rearward.

As illustrated in FIGS. 2 and 3, a striker 40, which is formed to be bent in a 'ㄷ' shape, is installed and protrudes downward at a front end of the hood panel 10, and the striker 40 is caught by a hood latch 50 installed on the vehicle body so as to allow the hood panel 10 to be in a locked state.

In the illustrated exemplary embodiment, the striker 40 may include: an upper catching portion 42 which is disposed at a rear side of the vehicle and caught by the hood latch 50 at normal times, and a lower catching portion 44 which is disposed at a front side of the vehicle and caught by the hood latch 50 when the hood panel 10 pops up.

As illustrated in FIG. 4, the upper catching portion 42 and the lower catching portion 44 are formed to have a predetermined difference in height, and the upper catching portion 42 may be formed at a relatively higher position than the lower catching portion 44.

That is, a gap A between the upper catching portion and the hood panel is relatively smaller than a gap B between the lower catching portion and the hood panel, and as a result, when the hood latch 50 is caught by the lower catching portion 44, the hood panel 10 may be further raised by a difference between the gap A between the upper catching portion and the hood panel and the gap B between the lower catching portion and the hood panel.

As illustrated in FIGS. 2 and 4, the hood latch 50 is fixed to the upper catching portion 42 at normal times, but as illustrated in FIGS. 3 and 4, the fixing point of the hood latch 50 is moved in a direction toward the lower catching portion 44 when the hood panel 10 pops up.

Therefore, the hood panel 10 is entirely raised, the front portion of the hood panel 10 is not lowered, and as a result, unlike the related art, the present invention has an effect of improving pedestrian protection performance.

Figure 5:
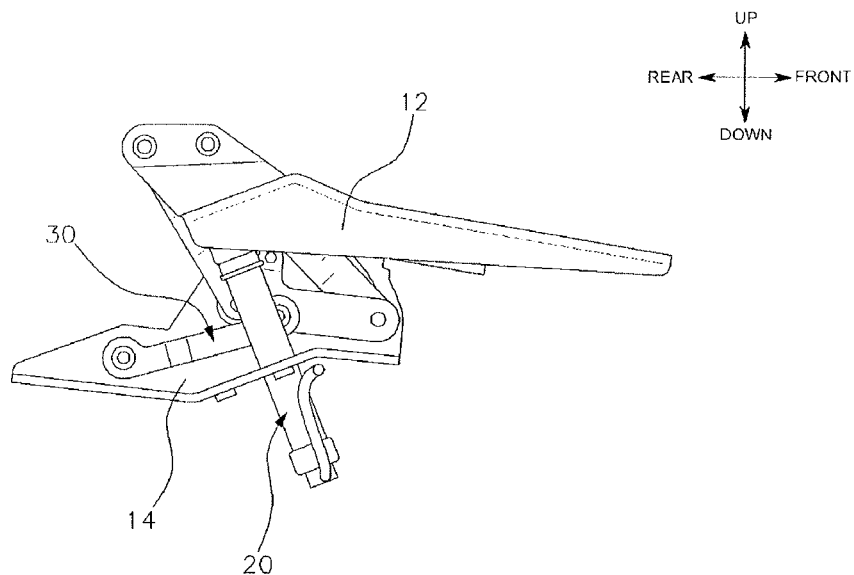
FIG. 5 is a side view illustrating an appearance of an operating unit before the hood panel according to the exemplary embodiment of the present invention pops up.
Figure 6:
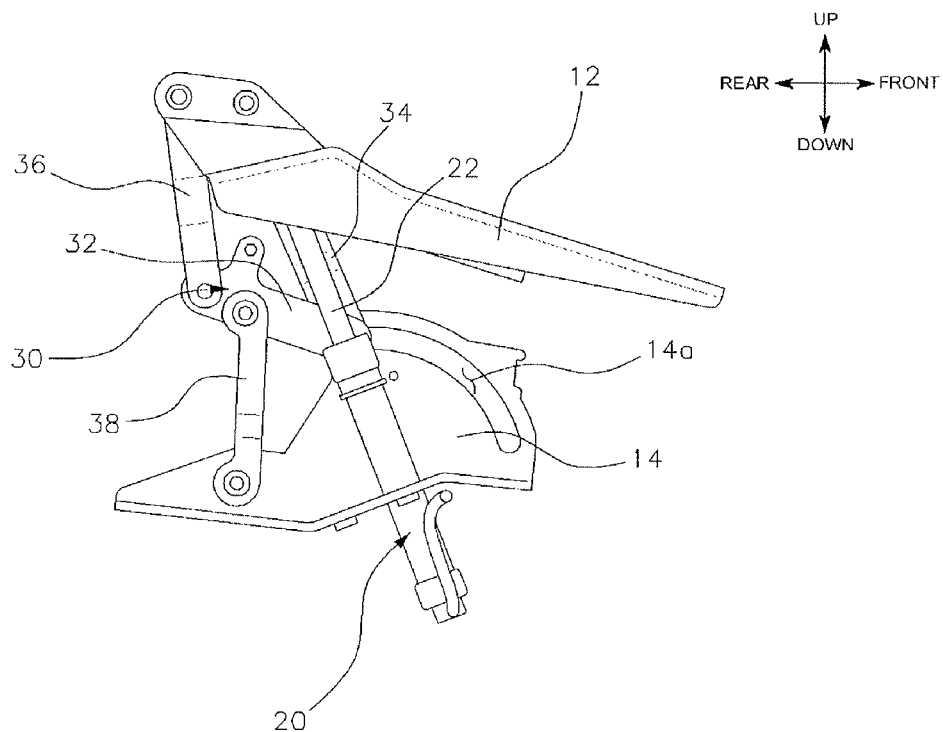
FIG. 6 is a side view illustrating an appearance of the operating unit after the hood panel according to the exemplary embodiment of the present invention pops up.

FIG. 5 is a side view illustrating an appearance of the operating unit before the hood panel according to the exemplary embodiment of the present invention pops up, and FIG. 6 is a side view illustrating an appearance of the operating unit after the hood panel according to the exemplary embodiment of the present invention pops up.

The operating unit 30 may include: a first link member 32 which has one end that is slidably accommodated in a circular arc shaped slot 14a formed in the bracket 14, a second link member 34 which rotatably connects one end of the first link member 32 and one end of the hood hinge 12, and a third link member 36 which rotatably connects the other end of the first link member 32 and the other side of the hood hinge 12.

As illustrated in FIG. 5, before the hood panel 10 pops up, one end (front end in the illustrated exemplary embodiment) of the first link member 32 and one end (front end in the illustrated exemplary embodiment) of the second link member 34 are accommodated at a lower end of a front side of the circular arc shaped slot 14a.

As illustrated in FIG. 6, as the rod 22 of the hinge actuator is raised when receiving a signal from the detecting sensor disposed at the front portion of the vehicle, the one end of the first link member 32 and the one end of the second link member 34 are moved along the slot 14a toward an upper end of a rear side thereof.

Accordingly, the first link member 32, the second link member 34, and the third link member 36 move the hood hinge 12 upward and rearward while being entirely moved upward and rearward, and the hood panel 10 connected to the hood hinge 12 is raised upward and rearward.

In this case, the first link member 32, the second link member 34, the third link member 36, and the hood hinge 12 may be disposed to form a parallelogram, and the present invention has an effect of allowing the hood panel 10 to easily pop up upward and rearward using the simple link structure.

A supporting member 38 is rotatably connected between the first link member 32 and the bracket 14, and the supporting member 38 serves to support the operating unit 30 at a lower end of the first link member 32 when the hood panel 10 pops up.

That is, in an exemplary embodiment of the present invention, the hood panel 10 does not return back immediately after the hood panel 10 pops up at the time of a pedestrian collision accident, but may be maintained in a pop-up state for a predetermined time, thereby protecting the pedestrian so as to prevent the pedestrian from secondarily colliding with the engine.

In addition to the aforementioned configuration, the hinge actuator 20 according to the exemplary embodiment of the present invention includes therein a plurality of vent holes through which gas may pass, such that the hood panel 10 may be maintained in a pop-up state for a predetermined time by the supporting member 38 after the hood panel 10 pops up, and then, the hood panel 10 may be slowly lowered when the hood panel 10 returns back.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active hood device for a vehicle, comprising:
    a hood panel which is provided in the front of a vehicle body to cover an engine room of the vehicle, and rotatably mounted by a hood hinge coupled to a rear end of the hood panel;
    a hinge actuator which has a first side connected to the hood hinge, and a second side coupled to a bracket coupled to the vehicle body, and has a rod that is movable upward and downward;
    a circular arc-shaped slot formed in the bracket; and
    an operating unit which connects the circular arc-shaped slot of the bracket and the hood hinge, and allows the rod of the hinge actuator to be moved upward and rearward when the rod is raised,
    wherein at a time of a vehicle-pedestrian collision accident, the hood actuator is operated by a signal from a detecting sensor installed at a front portion of the vehicle, to raise the rod, and the rod allows the hood panel to pop up upward and rearward while being raised upward and rearward by the operating unit moving along the circular arc-shaped slot.

2. The active hood device of claim 1, further comprising:
    a striker which is installed to protrude downward at a front end of the hood panel; and
    a hood latch which is installed on the vehicle body so that the striker is caught by the hood latch, and the hood panel is in a locked state.

3. The active hood device of claim 2, wherein the striker includes:
    an upper catching portion which is disposed at a rear side of the vehicle, and caught by the hood latch at normal times; and
    a lower catching portion which is disposed at a front side of the vehicle, and caught by the hood latch when the hood panel pops up,
    wherein the upper catching portion is formed at a relatively higher position than the lower catching portion.

4. The active hood device of claim 1, wherein the operating unit includes:
    a first link member which has a first end that is slidably accommodated in the circular arc-shaped slot formed in the bracket;
    a second link member which rotatably connects the first end of the first link member and a side of the hood hinge; and
    a third link member which rotatably connects a second end of the first link member and a second side of the hood hinge.

5. The active hood device of claim 4, further comprising:
    a supporting member which rotatably connects the first link member and the bracket,
    wherein the supporting member supports the operating unit at a lower end of the first link member when the hood panel pops up.

* * * * *